Dec. 28, 1926.  
C. S. REED  
1,612,317  
METHOD OF AND APPARATUS FOR WELDING  
Filed July 23, 1925  
4 Sheets-Sheet 1

INVENTOR.  
C. S. Reed  
BY  
ATTORNEYS.

Dec. 28, 1926.  
C. S. REED  
1,612,317  
METHOD OF AND APPARATUS FOR WELDING  
Filed July 23, 1925  
4 Sheets-Sheet 2

Dec. 28, 1926.  1,612,317
C. S. REED
METHOD OF AND APPARATUS FOR WELDING
Filed July 23, 1925   4 Sheets-Sheet 3

INVENTOR
C. S. Reed
BY
ATTORNEYS

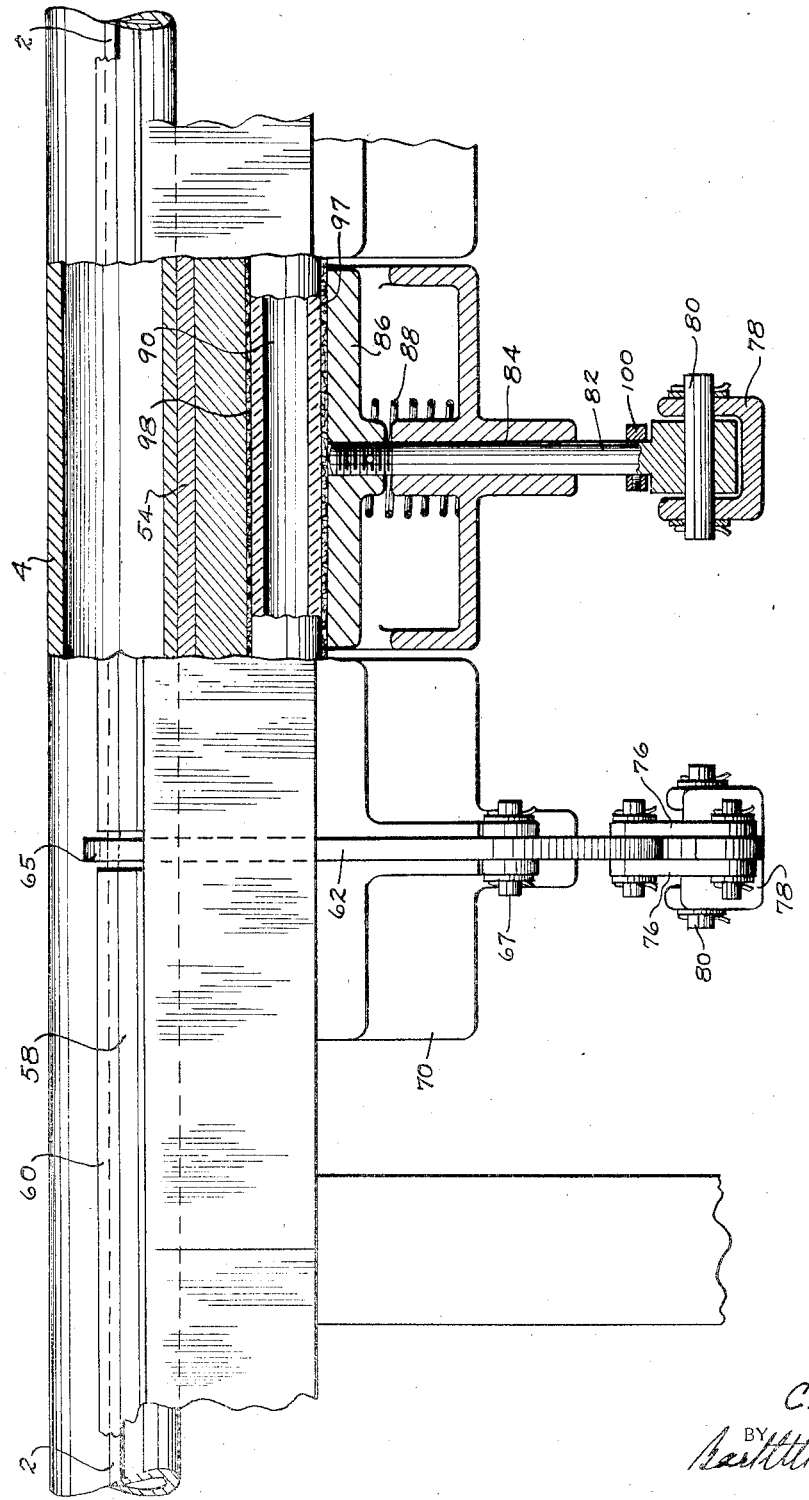

Patented Dec. 28, 1926.

1,612,317

UNITED STATES PATENT OFFICE.

CARL S. REED, OF YONKERS, NEW YORK, ASSIGNOR TO INTERNATIONAL COMBUSTION ENGINEERING CORPORATION, OF NEW YORK, N. Y., A CORPORATION OF DELAWARE.

METHOD OF AND APPARATUS FOR WELDING.

Application filed July 23, 1925. Serial No. 45,499.

Boilers of the type known as radiant tube boilers are provided with tubes that are arranged vertically adjacent the inner side of the furnace wall. These tubes are provided with laterally projecting heat radiating fins that extend substantially the length thereof and are welded thereto. Because of the length of the tubes which is frequently thirty feet or more, considerable difficulty has heretofore been experienced in properly welding the fins to the tubes so that the welded seams may withstand the intense heat to which they are subjected.

An object of the present invention is to provide a method which is particularly adapted for use in welding the fins of radiant boiler tubes which may be carried out economically, rapidly and efficiently.

Another object of the invention is to provide a novel and improved apparatus for carrying out the method.

Another object of the invention is to provide an apparatus which is capable of welding both of the fins simultaneously to a tube and in which the welding tools are carried along to form the weld by power operated means.

Another object of the invention is to provide a novel and improved work holding device which is particularly adapted for use in assembling the fins and tubes, and holding them in position during the welding operation.

The several features of the invention, whereby the above mentioned and other objects may be attained, will be clearly understood from the following description and accompanying drawings, in which, Figure 1 is an end view of my improved welding apparatus;

Fig. 5 is a transverse sectional view taken on the line 5—5 of Fig. 3.

Figure 1:
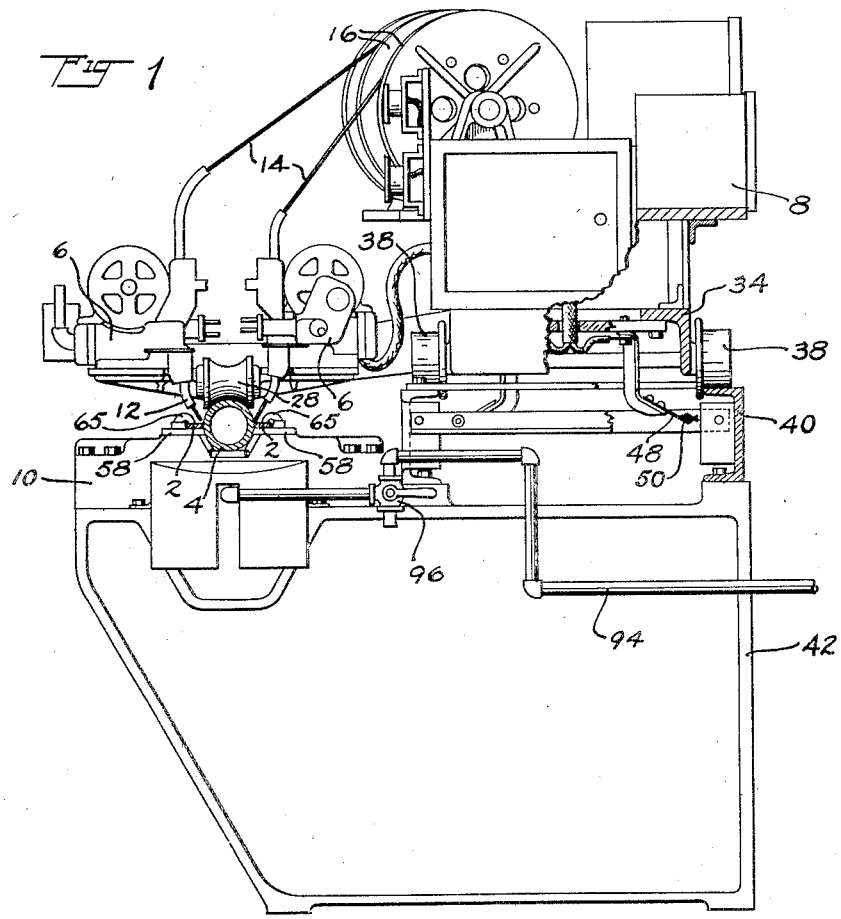
Figure 2:
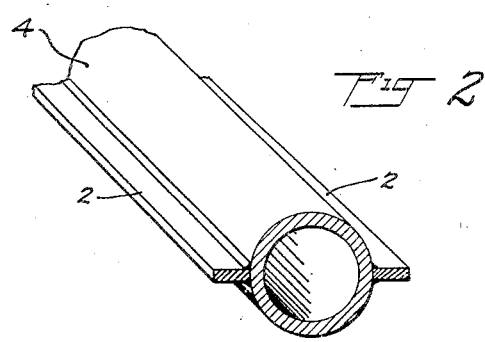
Fig. 2 is a view in perspective of a portion a completed radiant boiler tube.
Figure 3:
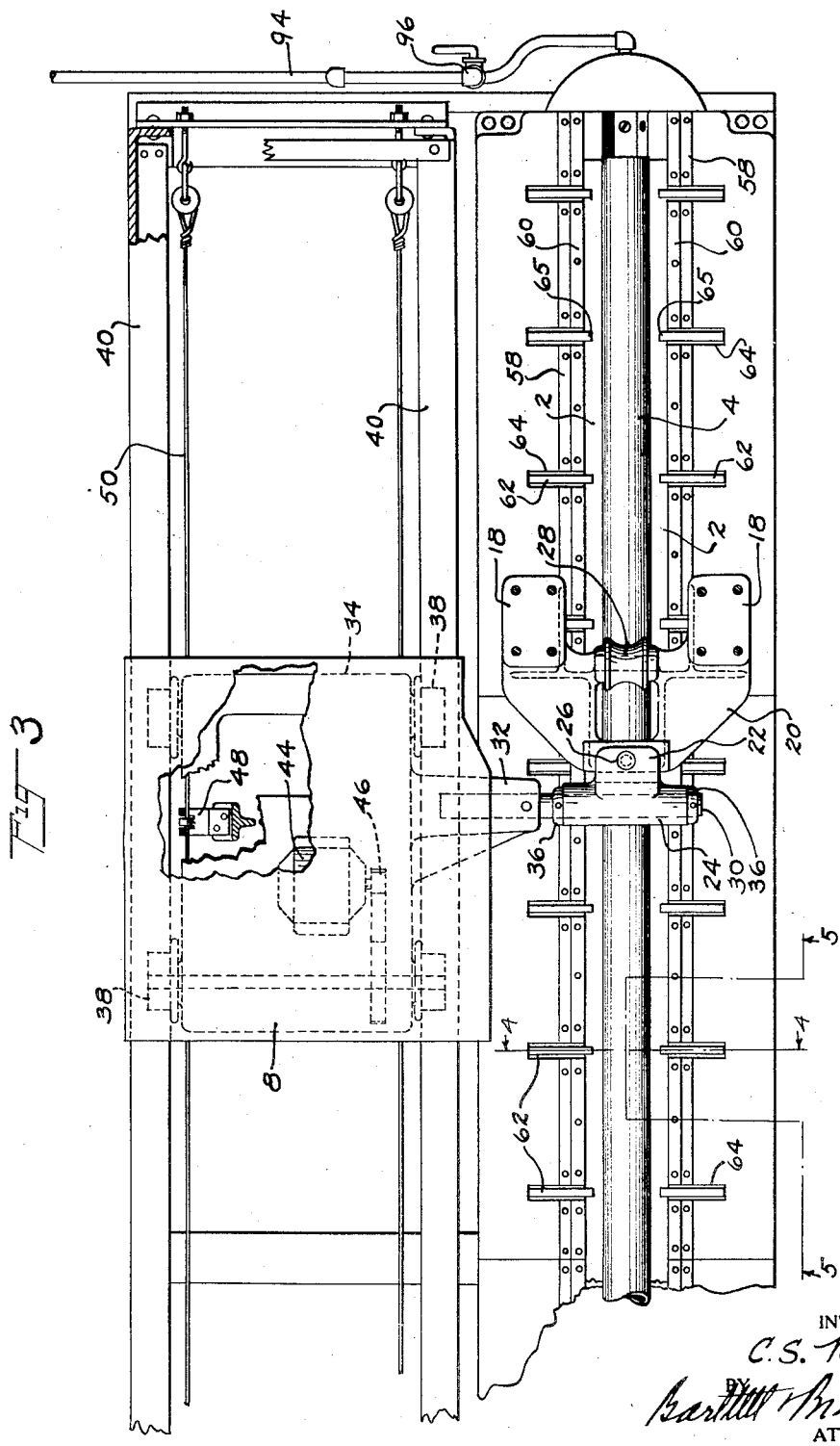
Fig. 3 is a plan view, partly broken away and partly in section, of the apparatus.
Figure 4:
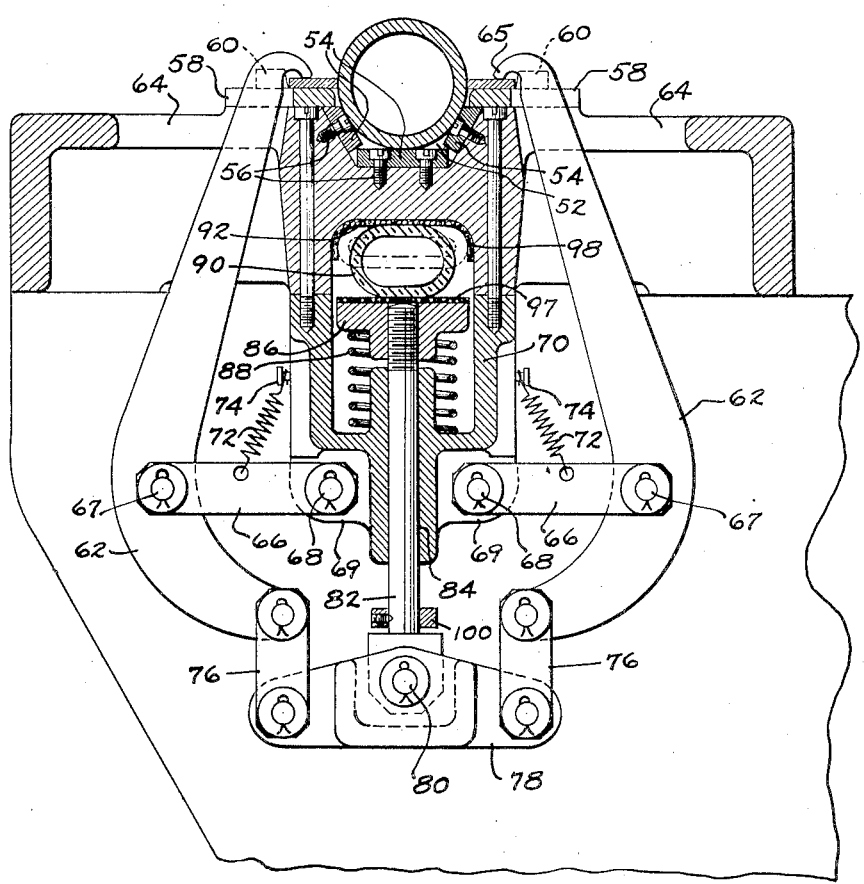
Fig. 4 is a sectional side view, on an enlarged scale, taken on the line 4—4 of Fig. 3.

The apparatus illustrated in the drawings is particularly adapted for use in welding fins to a tube to form a radiant boiler tube, such as illustrated in Fig. 2 of the drawings, in which the fins are indicated at 2 and the tube at 4. The apparatus is provided with two welding heads 6 that are carried by a carriage 8 which is driven by power operated means to cause the welding heads to traverse over the tube and fins so as to permit both fins to be welded simultaneously to the tube, the tube and fins being held in assembled position, by means hereinafter described, on a work supporting table 10. Each of the welding heads may be of a well known construction, having a nozzle 12 and suitable devices for feeding the welding material 14 through the nozzle to the seam to be welded, the welding material being drawn from reels 16 mounted upon the carriage 8. The welding heads are mounted upon forwardly projecting portions 18 of a support 20, which has its rear end arranged between relatively wide forwardly projecting ears 22 on a horizontal sleeve 24, and pivotally mounted on a pin 26 extending vertically through the ears. A guide roll 28 is centrally mounted on the support 20 slightly back of the welding heads. This guide roll is adapted to ride on the tube 4 on the work supporting table and is grooved so as to substantially fit the tube. The sleeve 24 is mounted for turning movement on a horizontal pin 30 which projects transversely over the work supporting table and is secured in a socket in a boss 32 projecting from the base 34 of the carrier, the sleeve 24 being held from longitudinal movement on the pin 30 by means of collars 36 secured on the pin and engaging the ends of the sleeve. This mounting of the supporting sleeve 24 on the pivot pin 30 permits the support 20 to be raised and lowered to move the nozzles 12 toward and from the work.

The carrier 8 is provided with flanged wheels 38 which ride upon tracks 40 in the form of channel irons that are mounted on the top of the supporting base 42 of the apparatus and are arranged at one side of the table 10 which is also mounted upon said base. The carrier is adapted to be propelled back and forth along the tracks by means of an electric motor 44 mounted thereon and having its shaft connected with the axle 45 of the rear driving wheels through speed reducing gearing 46. The driving motor 44 is energized through trolleys 48 mounted on the carrier 8 and engaging trolley wires 50 suitably mounted on the base of the apparatus. The electric driving motor 44 of the carrier, the devices for drawing the welding material from the reels 16 and feeding the material through the nozzles, and also the electrical connections with the welding heads are controlled by suitable switching devices (not shown) conveniently arranged on the carrier, so that the operator may easily control the operation of the complete apparatus.

With this construction it will be apparent that to weld the seams between the fins and tube when they are properly assembled on the work supporting table 10, the carrier is caused to travel forwardly along the track so as to cause the welding heads to be moved longitudinally of the fins and tube and thus permit the nozzles of the head to properly direct the welding material into the seams. The mounting of the support 20 for the welding heads whereby it may be freely turned about the vertical pivot pin 26, permits the grooved guide roll 28 through its engagement with the tube that is being operated upon, to guide the support centrally with relation to the tube, thus ensuring the ends of the welding nozzles being maintained equal distances from the seams to be welded. The pivotal mounting of the horizontal supporting sleeve 24, permits the welding heads and their nozzles to be raised and lowered toward and from the work.

In the illustrated construction means is provided for securely holding the tube and fins in assembled position during the welding operation and for assisting in assembling them. To provide for this the work supporting table 10 is provided with an upwardly opening and longitudinally extending trough-shaped groove or recess 52 which is lined with strips 54 secured to the wall thereof by screws 56. Plates 58 are secured longitudinally on the top of the work supporting table with their inner edges arranged adjacent the edges of the groove 52. The groove 52 is of suitable depth so that when the tube is positioned therein, slightly more than one-half thereof projects above the plates 58. The groove 52 is of suitable shape and the lining strips 54 of suitable thickness so that the tube will rest upon all three of the strips and thus be firmly supported.

After the tube is thus positioned, the fins 2 are placed on the plates 58 with their inner edges engaging the sides of the tube, the top surface of the plates 54 being arranged so as to cause the fins to be positioned diametrically opposite each other with relation to the tube. Guide bars or strips 60 having their inner surfaces or edges inclined downwardly and inwardly are secured on the plates 58 and are properly positioned so that in applying the fins, said inclined edges of the strips 60 will uniformly cause the fins to be tightly pressed against the sides of the tube throughout their length.

When the tube and fins are thus assembled on the table, clamping devices are operated to securely clamp the fins down upon the table. As shown each of these clamping devices comprises two levers 62 arranged at opposite sides of the work supporting portion of the table. The upper end portions of these levers extend through slots 64 in the top of the table and are provided with downwardly and inwardly turned ends that form clamping jaws 65 that engage the fins. A pair of parallel links 66 have their outer ends pivoted on the ends of a pin 67 extending through an aperture in each clamping lever 62, and have their inner ends pivoted on the ends of a pin 68 extending through an aperture in an ear 69 on the lower end of a depending bracket or hanger 70 secured by bolts 71 to the under side of the top of the table. The two pairs of links 66 tend to be swung upwardly about the axes of their pivotal connections with the hanger 70 by means of coiled springs 72 having their lower ends centrally connected with the links and their upper ends secured by pins 74 to the sides of the hanger. The portions of the clamping levers 62 above their pivotal connections with the links 66, when the clamping device is in operative engagement with the work, are inclined downwardly and outwardly so as to position their lower portions a distance from the sides of the hanger 70. The lower portions of the clamping levers 62 are curved downwardly and inwardly from substantially said pivotal connections of the levers with the links 66. The extreme lower ends of the clamping levers 62 are connected by links 76 with the ends of an equalized lever 78 which is centrally pivoted upon a horizontal pin 80 which extends through and is secured to the lower end of a plunger rod 82. This plunger rod extends vertically through a suitable bearing 84 in the hanger 70. The upper end of each plunger rod 82 is provided with a head 86 screw-threaded thereon. The plunger rod is urged upwardly by means of a spring 88 coiled about bosses on the hanger 70 and head 86 through which the rod extends. With this construction it will be apparent that upon downward movement of the plunger rod, when the device is in open or released position, the rod will act through the equalizing lever 78 and the links 76 to carry the jaws of the levers 62 downwardly and at the same time the links 66 will cause the lower portions of the levers 62 to be forced outwardly against the action of the springs 72, and thus cause the jaws to be brought uniformly down upon the fins so as to securely clamp the fins down upon the work supporting table.

The clamping devices are spaced equal distances apart throughout the length of the table and in the illustrated construction means is provided for simultaneously closing all of the clamping devices down upon the work. As shown, this means comprises an inflatable tube 90 which is arranged in a channel 92 in the under side of the work supporting table, the tube being positioned between the upper wall of the channel 92 and the several plunger heads 86. The ends of the tube 90 are closed, and the forward end thereof is in communication with a suitable source of compressed air supply through a pipe 94 having a valve 96 for controlling the supply of air to the tube. The top surface of the plunger head 86 is covered by a strip of asbestos or other heat-resisting material 97, and the upper portion of the inside of the groove or channel 92 is lined with a similar strip of material 98, so as to heat insulate the tube.

The plunger rod 82 has a stop collar 100 secured thereon which by engagement with the lower end of the boss 84 through which the plunger rod extends, limits the distance the jaws may open.

With this construction it will be apparent when the fins and tube are assembled in proper position on the work supporting table, as above described, that by admitting compressed air to the tube 90 from the valve control pipe 96, the clamping levers 62 of all of the clamping devices may be operated simultaneously and uniformly to cause the clamping jaws 60 to securely clamp the fins 2 down upon the work supporting table 58.

When the seams between the fins and tube have been welded on one side, the clamping devices may be released to permit the work to be turned over and welded on the other side.

As will be evident to those skilled in the art, my invention permits various modifications without departing from the spirit thereof or the scope of the appended claims.

What I claim is:

1. The method of welding fins to a tube to form a radiant boiler tube which comprises positioning the tube on a support, applying the fins to the tube with their inner longitudinal edges engaging the tube in the position they assume when the tube is completed, clamping the fins in position, and arc welding by continuous welds both of said fins to the tube simultaneously while utilizing said tube as a guide to determine the lines of weld.

2. An apparatus for use in welding fins to boiler tubes of the class described having, in combination, a table, means for holding the tube and fins in assembled position on the table, arc welding devices, and power operated means for traversing both of said devices longitudinally of the tube to weld both of the fins simultaneously to the tube.

3. An apparatus for use in welding fins to boiler tubes of the class described having, in combination, a table, means for holding the tube and fins in assembled position on the table, a carrier mounted to travel in a direction longitudinally of the tube, and arc welding devices carried by the carrier for welding both of said fins to the tube during the travel of the carrier.

4. An apparatus for use in welding fins to boiler tubes of the class described having, in combination, a table, means for holding the tube and fins in assembled position on the table, arc welding devices, power operated means for traversing said devices longitudinally of the tube to weld both of the fins simultaneously to the tube, and means engaging the tube for guiding both of said devices during the welding operation.

5. An apparatus for use in welding fins to boiler tubes of the class described having, in combination, a table, means for holding the tube and at least one of the fins in assembled position on the table, a carrier mounted to travel in a direction longitudinally of the tube, arc welding means carried by the carrier for welding said fin to the tube, and means engaging the tube for guiding said welding means during the travel of the carrier.

6. An apparatus for use in welding fins to boiler tubes of the class described having, in combination, a table, means for holding the tube and fins in assembled position on the table, a carrier mounted to travel in a direction longitudinally of the tube, a support carried by the carrier and extending over the tube, connections between the said support and the carrier for permitting the forward end of said support to be moved in a direction laterally of the tube and up and down toward and from the tube, a grooved guide roll carried by said support and engaging the tube during the travel of the carrier, and arc welding means mounted on the forward portion of said support for welding said fins to the tube during the travel of the carrier in one direction longitudinally of the tube.

7. An apparatus for use in welding fins to boiler tubes of the class described having, in combination, a table, means for holding the tube and fins in assembled position on the table, a carrier mounted to travel in a direction longitudinally of the tube, a support carried by the carrier and extending over the tube, connections between the said support and the carrier for permitting the forward end of said support to be moved in a direction laterally of the tube and up and down toward and from the tube, a grooved guide roll carried by said support and engaging the tube during the travel of the carrier, and arc welding devices mounted on the forward portion of said support for welding said fins to the tube during the travel of the carrier in one direction longitudinally of the tube, and acting a distance in advance of the point of engagement of said guide roll with the tube.

8. An apparatus for use in welding fins to boiler tubes of the class described having, in combination, a table, means for holding the tube and fins in assembled position on the table, a carrier mounted to travel in a direction longitudinally of the tube, a support carried by the carrier and extending over the tube, connections between the said support and the carrier for permitting the forward end of said support to be moved in a direction laterally of the tube and up and down toward and from the tube, a grooved guide roll carried by said support and engaging the tube during the travel of the carrier, and arc welding heads mounted on said support and spaced a distance from opposite ends of said guide roll for welding said fins to the tube.

9. An apparatus for use in welding fins to boiler tubes of the class described having, in combination, a table, means for holding the tube and fins in assembled position on the table, a carrier mounted to travel in a direction longitudinally of the tube, power operated means for thus traversing the carrier, a bracket member projecting laterally from the carrier and extending over said tube, a support mounted on said bracket member, connections between the rear end of said support and said bracket member to permit pivotal movement of said support about a horizontal axis transversely of the tube and about a vertical axis, a grooved guide roll mounted on said support for engagement with the tube during the travel of the carrier, and welding heads mounted on said support at opposite sides of said guide roll for welding said fins to the tube during the travel of the carrier in one direction.

10. A work holding device of the class described having, in combination, a support upon which the work is placed, a plurality of plungers mounted beneath the work supporting surface of said support and spaced apart, means for moving said plungers simultaneously in one direction, and a clamping device associated with each plunger acting during the movement of the plunger in said direction to engage the work at points adjacent opposite edges thereof to clamp the work to said support.

11. A work holding device having, in combination, a support upon which the work is placed, a plurality of plungers mounted beneath the work supporting surface of said support and spaced apart, means for moving said plungers simultaneously in one direction comprising an inflatable tube, a spring to move each plunger toward the tube, means for causing inflation and deflation of the tube, and a clamping device associated with each plunger and acting during the movement of the plunger in said direction to engage the work at points adjacent to opposite sides thereof.

12. A work holding device having, in combination, a support upon which the work is placed, a pair of jaws arranged at opposite sides of said support and adapted to be moved to engage the work adjacent to opposite edges thereof, a plunger mounted beneath the work supporting surface of said support, means for moving the plunger in opposite directions, and connections between said plunger and jaws comprising an arrangement of links and levers for simultaneously moving said jaws toward said points of engagement with the work during the movement of said plunger in one direction.

13. A work holding device having, in combination, a support upon which the work is placed, levers arranged at opposite sides of said support having jaws on their upper ends adapted to engage the work adjacent to opposite sides thereof, a vertically reciprocable plunger arranged beneath said support, a lever pivotally mounted on the lower end of said plunger, links pivotally connecting the lower ends of said pair of levers with the ends of said lever carried by said plunger, and links having their outer ends pivotally connected with said pair of levers, respectively, at points arranged between the ends of said levers and having their inner ends pivotally mounted on said work support.

14. An apparatus for use in welding fins to boiler tubes of the class described having, in combination, a support, means for holding the tube and at least one of the fins in assembled position on said support, an arc welding device, and power operable means for relatively traversing said support and said arc welding device in a direction longitudinally of the tube to weld said fin to the tube.

In testimony whereof, I have signed my name to this specification this 20th day of July, 1925.

CARL S. REED.